US006515772B1

(12) United States Patent
Holowko et al.

(10) Patent No.: US 6,515,772 B1
(45) Date of Patent: *Feb. 4, 2003

(54) APPARATUS AND METHOD FOR ENGRAVING A GRAVURE PRINTING CYLINDER

(75) Inventors: Paul L. Holowko, Spring Valley, OH (US); John W. Fraser, Dayton, OH (US); Eric J. Serenius, Springboro, OH (US); Curtis Woods, Centerville, OH (US)

(73) Assignee: MDC Max Daetwyler AG (CH)

(*) Notice: Subject to any disclaimer, the term of this patent is extended or adjusted under 35 U.S.C. 154(b) by 0 days.

This patent is subject to a terminal disclaimer.

(21) Appl. No.: 09/153,718

(22) Filed: Sep. 15, 1998

Related U.S. Application Data

(63) Continuation of application No. 08/837,987, filed on Apr. 15, 1997, now Pat. No. 5,808,749, which is a continuation of application No. 08/476,657, filed on Jun. 7, 1995, now Pat. No. 5,621,533, which is a continuation of application No. 08/022,127, filed on Feb. 25, 1993, now Pat. No. 5,424,845.

(51) Int. Cl.[7] .............................. B41C 1/02; B41C 1/04
(52) U.S. Cl. ..................... 358/3.29; 700/170; 700/173; 358/406
(58) Field of Search ........................ 358/1.9, 299, 406, 358/3.29; 408/79, 84, 131, 147, 183, 184, 186, 188, 204, 206, 207, 208; 700/170, 173, 174, 195

(56) References Cited

U.S. PATENT DOCUMENTS

| 2,493,628 A | 1/1950 | Harley |
| 2,777,058 A | 1/1957 | Boyajean |
| 2,874,479 A | 2/1959 | Farber |
| 2,943,564 A | 7/1960 | Demer |

(List continued on next page.)

OTHER PUBLICATIONS

"Numerical Analysis: A Practical Approach," by Melvin J. Maron, p. 188.
"The Image Processing Handbook," by John C. Russ, pp. 105–113, 1992.
"Numerical Recipes in C: The Art of Scientific Computing," by William H. Press, Brian P. Flannery, Saul A. Teukolsky and William T. Vetterling, pp. 452, 460, 1988.
"Datwyler," Max Daetwyler Corporation, 13420 West Reese Blvd., Huntersville, NC 28078, undated brochure.
"Twin Pilot," Maschinenfabrik Kaspar Walter GmbH & Co. KG, Plinganserstrasse 22, 8000 Muncnen 70, Germany, "Druchtechnische Beratung–Grqaphischer Handel," Heimann GmbH, Hamm, Germany, 1984.
"Check–Master," Heimann GmbH, undated pamphlet.
"Engraving Tester ET 2000," Ahauser Tiefdruck–Gravuren GmbH & Co., undated pamphlet.
"The Gravure Engraving Manual," The Gravure Association of America, 1987.
"Basic Rotogravure," Balcom, 1998.
"M2B2 modele depose MICRO SURFACE Sarl," Promatec Graphique, Antony, France, 1987.
"VIP—Video–Image–Processing," author unknown, undated.

*Primary Examiner*—Scott Rogers
(74) *Attorney, Agent, or Firm*—Jacox, Meckstroth & Jenkins

(57) ABSTRACT

An engraver having an engraving signal generating system for engraving a workpiece. The engraver includes a setup circuit enabling direct dimensional control of the cavities engraved by the engraver. Controls are provided for setting at least one of a plurality of parameters, such as a black cell width. These parameters are fed to the setup circuit which translates them into multiplication factors for an AC signal and a videosignal. The multiplied signals are combined with an offset signal to produce an engraving signal.

24 Claims, 5 Drawing Sheets

U.S. PATENT DOCUMENTS

| | | |
|---|---|---|
| 3,612,753 A | 10/1971 | Korman |
| 3,652,992 A | 3/1972 | Koll |
| 3,769,455 A | 10/1973 | de Vos et al. |
| 3,876,829 A | 4/1975 | Schreiber |
| 3,904,816 A | 9/1975 | Taudt et al. |
| 3,918,348 A | 11/1975 | Runft |
| 3,931,570 A | 1/1976 | George et al. |
| 3,956,583 A | 5/1976 | Pugsley |
| 4,001,495 A | 1/1977 | Tauszig |
| 4,003,311 A | 1/1977 | Bardin .................. 101/426 |
| 4,012,584 A | 3/1977 | Gascoigne ............... 358/302 |
| 4,052,739 A | 10/1977 | Wada et al. ............... 358/299 |
| 4,072,928 A | 2/1978 | Wilder |
| 4,075,662 A | 2/1978 | Gall |
| 4,240,118 A | 12/1980 | Wellendorf et al. ......... 358/296 |
| 4,315,285 A | 2/1982 | Sommer et al. |
| 4,342,050 A | 7/1982 | Traino |
| 4,363,037 A | 12/1982 | Taudt ....................... 358/296 |
| 4,394,693 A | 7/1983 | Shirley ..................... 358/298 |
| 4,437,122 A | 3/1984 | Walsh et al. |
| 4,451,856 A | 5/1984 | Buechler ................... 358/299 |
| 4,503,468 A | 3/1985 | Serinken et al. |
| 4,612,584 A | 9/1986 | George et al. .............. 358/299 |
| 4,683,499 A | 7/1987 | Kuwabara |
| 4,683,500 A | 7/1987 | Kitamura et al. |
| 4,691,229 A | 9/1987 | Colditz et al. |
| 4,691,238 A | 9/1987 | Yamada |
| 4,700,235 A | 10/1987 | Gall |
| 4,944,593 A | 7/1990 | Kalstroem et al. |
| 4,972,323 A * | 11/1990 | Cauwet ..................... 358/3.29 |
| 5,029,011 A | 7/1991 | Fraser ...................... 358/299 |
| 5,229,861 A * | 7/1993 | Nozaka et al. .............. 358/3.3 |
| 5,293,426 A | 3/1994 | Wouch et al. |
| 5,416,597 A | 5/1995 | Mubaslat ................... 358/299 |
| 5,424,845 A * | 6/1995 | Holowko et al. ........... 358/299 |
| 5,617,217 A * | 4/1997 | Brewer et al. .............. 358/299 |
| 5,621,533 A * | 4/1997 | Holowko et al. ........... 358/299 |
| 5,808,748 A * | 9/1998 | Brewer et al. .............. 358/299 |
| 5,808,749 A * | 9/1998 | Holowko et al. ........... 358/299 |
| 5,828,464 A * | 10/1998 | Yoshida et al. ............ 358/3.29 |

\* cited by examiner

FIG-3  SIGNALS & CORRESPONDING ENGRAVING RESPONSE

APPARATUS AND METHOD FOR ENGRAVING A GRAVURE PRINTING CYLINDER

RELATED APPLICATION

This application is a continuation of Ser. No. 08/837,987 filed Apr. 15, 1997, now U.S. Pat. No. 5,808,749, which is a continuation of Ser. No. 08/476,657 filed Jun. 7, 1995, now U.S. Pat. No. 5,621,533, which is a continuation of Ser. No. 08/022,127 filed Feb. 25, 1993, now U.S. Pat. No. 5,424,845.

BACKGROUND OF THE INVENTION

This invention relates to engraving heads of the general type disclosed in Buechler U.S. Pat. No. 4,450,486. Such engraving heads comprise a diamond stylus carried by a holder mounted on an arm projecting from a torsionally oscillated shaft. A sine wave driving signal is applied to a pair of opposed electromagnets to rotate the shaft through a maximum arc of approximately 0.25 deg. at a frequency in the neighborhood of about 3,000 to 5,000 Hz.

A guide shoe is mounted on the engraving head in a precisely known position relative to the oscillating stylus. The engraving head is supported for tilting movement by a set of leaf springs secured to a rearwardly projecting bar. A DC motor rotates the bar so as to bring the guide shoe into contact with a printing cylinder to be engraved. When the guide shoe is in contact with the printing cylinder, the stylus oscillates from a position just barely touching the printing cylinder to a retracted position about 100 microns distant from the surface of the cylinder.

Once the guide shoe is in contact against the printing cylinder a video signal is added to the sine wave driving signal for urging the oscillating stylus into contact with the printing cylinder thereby engraving a series of controlled depth cells in the surface thereof. The printing cylinder rotates in synchronism with the oscillating movement of the stylus while a lead screw arrangement produces axial movement of the engraving head so that the engraving head comes into engraving contact with the entire printing surface of the printing cylinder.

In engraving systems of the type taught by Buechler, it is necessary for the machine operator to perform a tedious trial and error setup procedure at one end of the printing cylinder prior to commencement of engraving. This procedure involves adjustment of the gain on amplifiers for the sine wave driving signal and the video signal so as to produce "black" printing cells of a desired depth together with connecting channels of another desired depth and clean non-engraved white cells. Each change of one of the control variables interacts with the others, and therefore the setup becomes an iterative process.

It is therefore seen that a need has existed for an engraving system which may be quickly and easily set up to engrave cells of precisely controlled dimensions in the surface of a gravure printing cylinder.

SUMMARY OF THE INVENTION

The present invention provides an engraving apparatus and method wherein a plurality of parameter signals are supplied to a setup circuit for computing engraving parameters to control the engraving response of the engraving stylus to an input video signal. In a preferred embodiment an input AC signal and an input video signal are applied to a multiplication circuit wherein they are multiplied by multiplication factors which are generated by a setup circuit. The output signals from the multiplication circuits are combined with a white offset signal to produce an engraving signal for driving the engraving stylus to engrave a series of cells of the desired geometry.

The setup circuit is provided with input signals which indicate a desired black cell width, a desired channel width, a desired highlight cell width and the video voltage level at which a highlight cell of the desired width is to be engraved. Further, in accordance with the present invention the setup circuit may be provided with an input signal which adjusts the multiplication factor as appropriate for the geometry of the particular stylus tip which happens to be in use. This input signal corresponds to the cutting depth/width ratio, which in turn depends upon the tip angle of the stylus.

DESCRIPTION OF THE PREFERRED EMBODIMENTS

Figure 1:
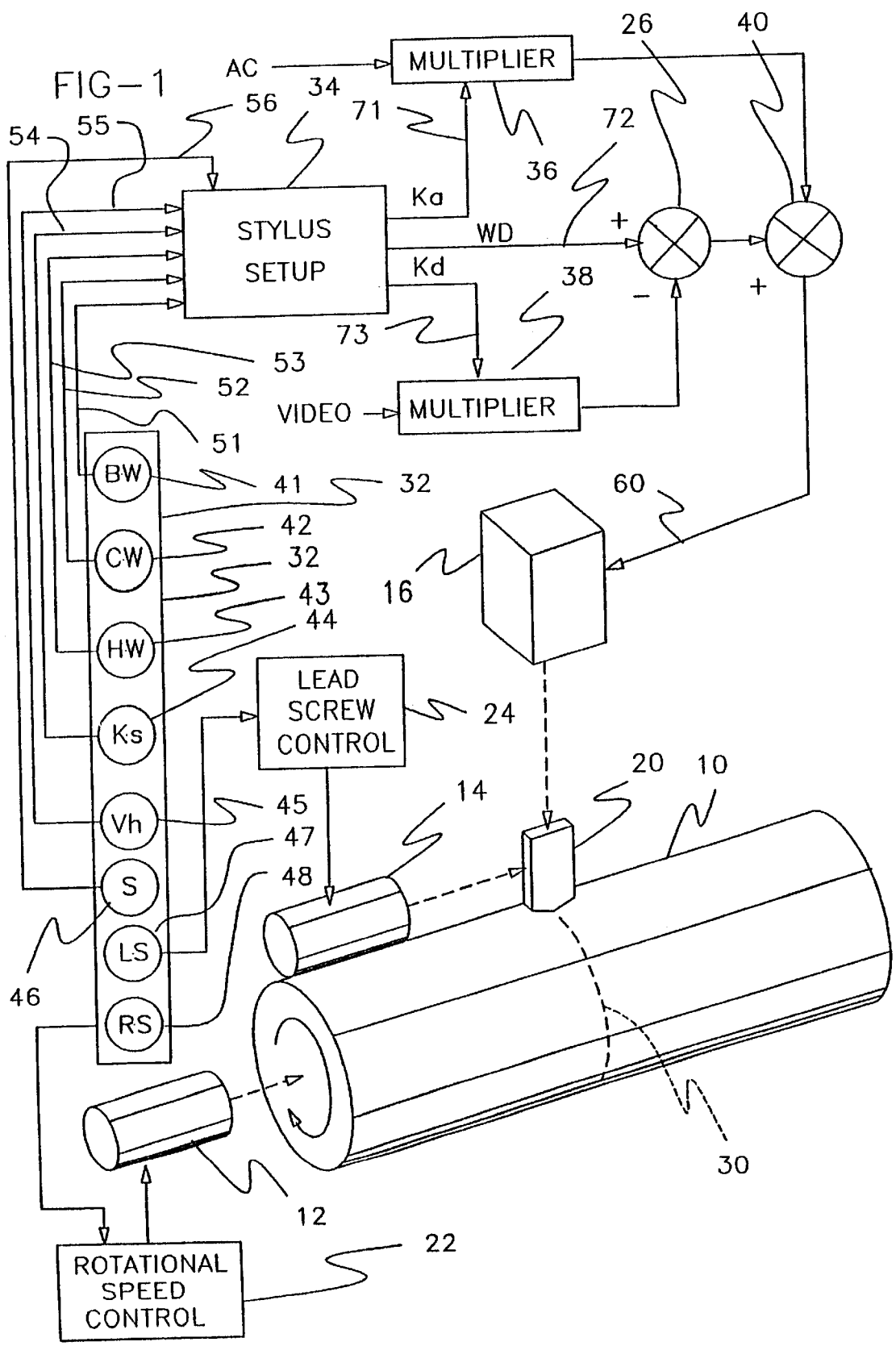
FIG. 1 is a schematic illustration, partly in perspective, of a programmable engraving system according to the present invention.

Referring to FIG. 1 there is illustrated a gravure printing cylinder 10 mounted for rotation by a drive motor 12 and engraving by an engraving stylus 20. During the engraving operation, stylus 20 moves engravingly toward and away from printing cylinder 10 to produce a series of cells arranged along a track 30. A lead screw motor 14 causes axial movement of stylus 20 so as to produce a track 30. If lead screw motor 14 moves continuously, then track 30 will have a helical configuration. Intermittent movement of motor 14 produces a series of spaced circular tracks 30.

Stylus 20 is driven into engraving contact with print cylinder 10 by an electromagnetic driver 16 operating in response to a drive control signal on line 60. Electromagnetic driver 16 may be configured as generally disclosed in Buechler U.S. Pat. No. 4,450,486.

The signal on line 60 has an AC component, a video component and an offset component appropriate for producing an engraving action as hereinafter described. The AC component is derived from an AC input signal which is applied to a multiplier 36 and multiplied by a multiplication factor Ka obtained on a line 71 from a setup circuit 34. The AC product signal from multiplier 36 is applied to a summing junction 40 where it is combined with a signal from another summing junction 26. Summing junction 26 combines an offset signal WD from setup circuit 34 with an output signal from a second multiplier 38. The function of multiplier 38 is to multiply an input video signal by a factor Kd generated by setup circuit 34 on line 73.

The engraving operation may be controlled by an operator or by a programmed microprocessor. For setup purposes the system may be provided with a control panel 32 equipped with 8 controls 41–48. Controls 41–46 respectively signal a desired black width, BW, a desired channel width, CW, a desired highlight width, HW, a stylus constant, Ks, a highlight voltage Vh, and a shoe offset S. These six signals are applied to a stylus setup circuit 34. Control 47 provides for adjustment of a lead screw control circuit 24, and control 48 provides for adjustment of a rotational speed control circuit 22 connected to drive motor 12.

As hereinafter discussed in more detail, the AC component of the signal on line 60 causes stylus 20 to oscillate in a sinusoidal manner relative to printing cylinder 10 with a wavelength dependent upon the surface speed of the cylinder. The rotational speed of drive motor 12 must be adjusted so as to produce an engraving track 30 having an odd number of half wavelengths during a full engraving rotation. The lead screw control circuit 24 must be adjusted so as to cause lead screw motor 14 to advance stylus 20 an axial distance equal to one-half of a black cell width plus one-half of a connecting channel width, plus one separating wall width during each complete rotation of the printing cylinder 10.

Figure 2:
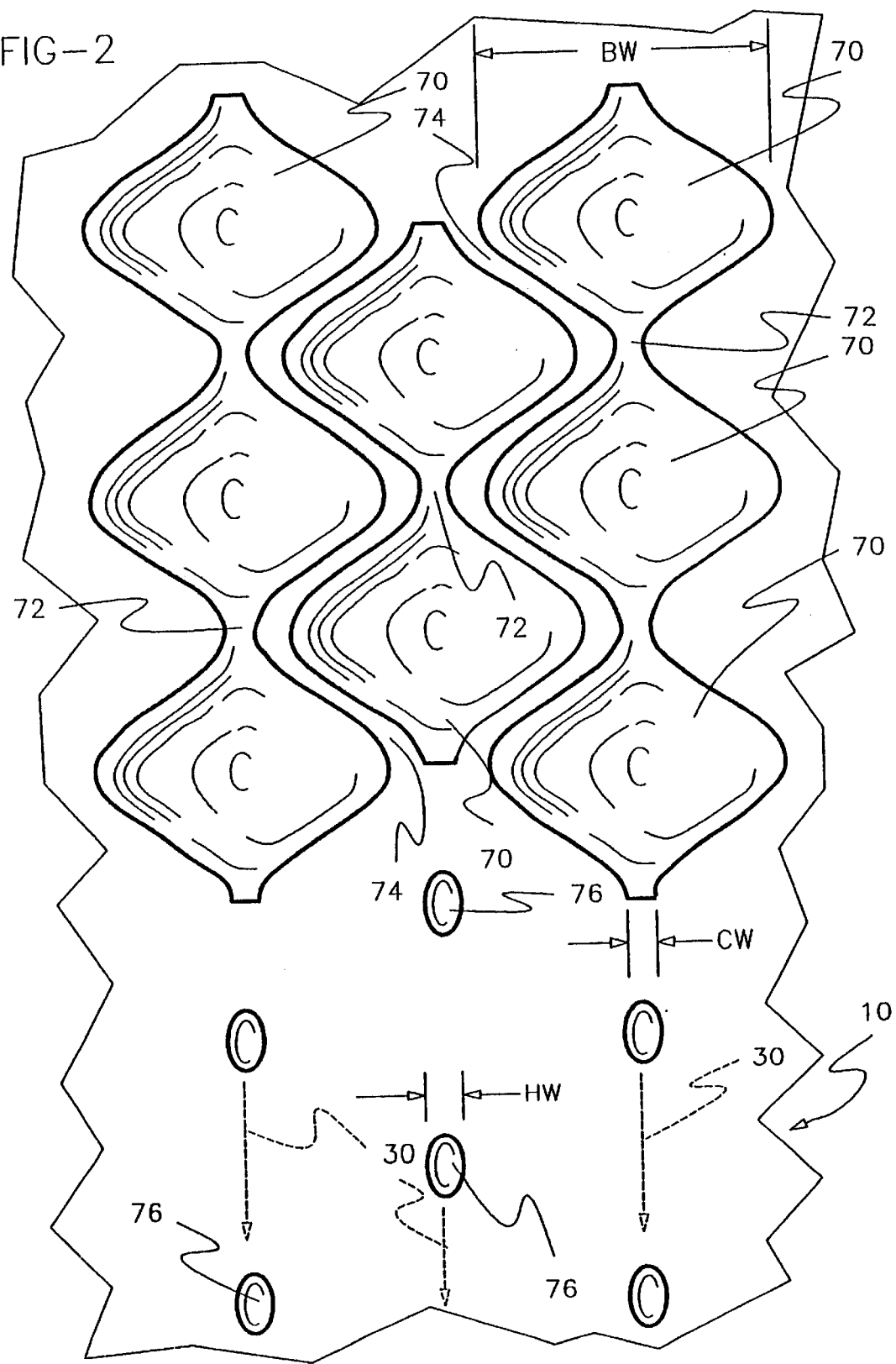
FIG. 2 is a schematic illustration of a series of cells engraved in a printing cylinder.

The geometrical configurations of typical black cells, connecting channels for black cells, highlight cells and separating walls are illustrated in FIG. 2. That figure depicts a series of wide, deep black cells 70 and a series of shallower and narrower highlight cells 76. The illustrated cells comprise portions of three side-by-side engraving tracks 30. Black cells 70 have a maximum width BW. The control signal for the stylus is adjusted so as to produce connecting channels 72 between successively engraved black cells 70. Channels 72 have a width CW, while highlight cells 76 have a width HW. The scalloped edges of the cells 70 result from the vertically oscillating cutting action of stylus 20 during rotational movement of printing cylinder 10 thereunder. As further illustrated in FIG. 2, a series of successively engraved black cells 70 may be separated by a wall 74 from a series of successively engraved cells 70 (also illustrated as being black cells) in an adjacent engraving track 30.

A series of cells configured as illustrated in FIG. 2 will print a graphic pattern defining a diagonally extending screen. The tangent of the screen angle is the ratio of one-half the wavelength of the stylus cutting motion to the distance between adjacent engraving tracks 30. The cutting wavelength is a function of the surface speed of the printing cylinder 10 and the oscillation frequency of stylus 20. Thus the screen angle may be adjusted by adjusting the rotational speed of drive motor 12, while holding the oscillation frequency constant but such adjustment must be made in incremental steps so as to maintain an odd number of half wavelengths around the circumference of the printing cylinder.

Figure 3:
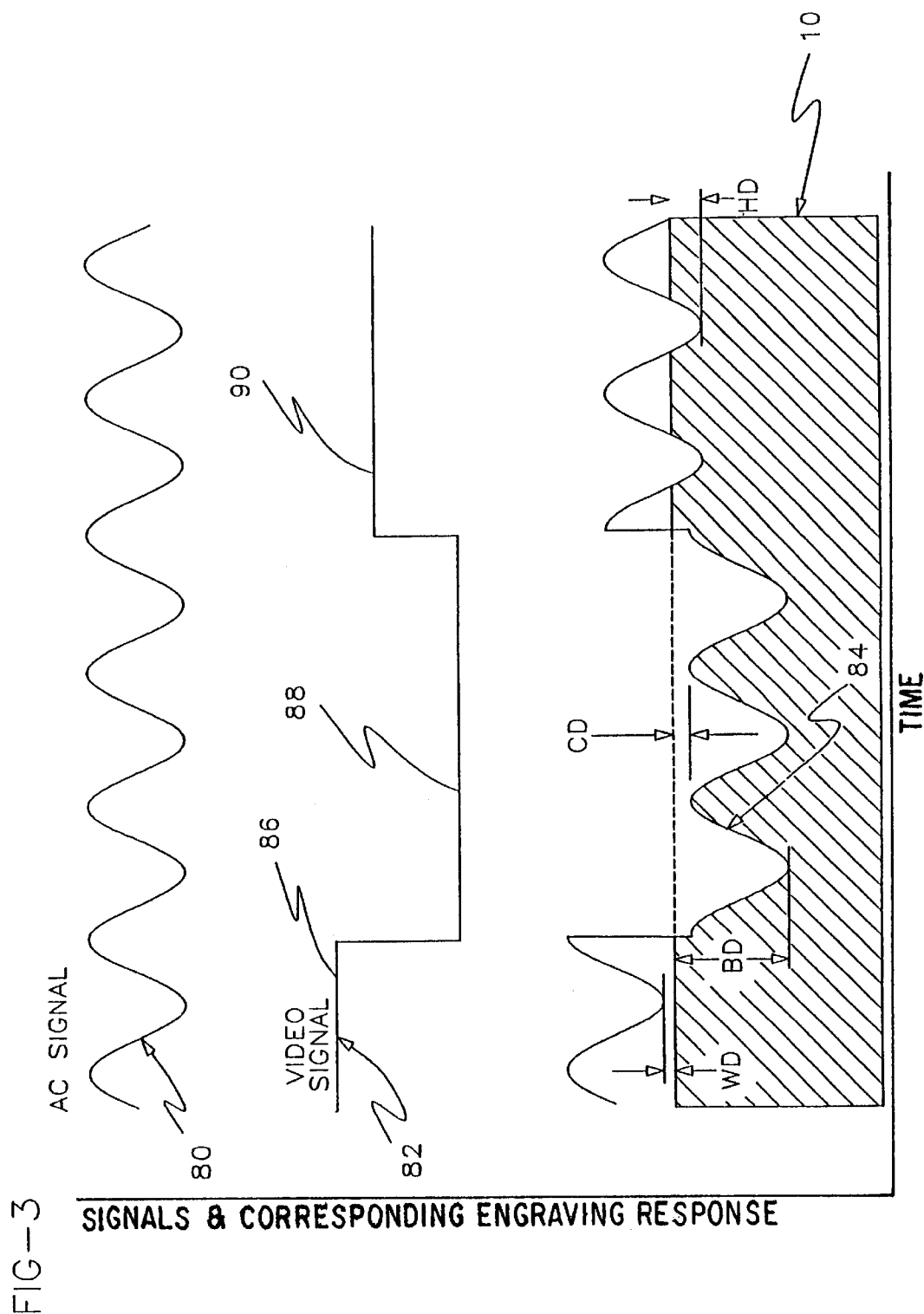
FIG. 3 is a schematic illustration of AC and video signals for controlling an engraving stylus and the engraving movement which results therefrom.

The driving signals for stylus 20 and the resulting vertical movement of the stylus are illustrated in FIG. 3. The driving signal is obtained by adding an AC signal 80 to a video signal 82. The illustrated video signal 82 has, by way of example, a white video level 86, a black video level 88 and a highlight video level 90. The video signal and the AC signal are combined with an offset such that the stylus is raised out of contact with the cylinder surface during the entire time that video signal 82 has a white level 86. The minimum white elevation is WD.

When video signal 82 goes from a white level to a black level, stylus 20 moves into engraving contact with the cylinder as shown by stylus position line 84. In this condition the stylus oscillates between a minimum depth CD and a maximum depth BD. When stylus 20 is at the depth CD, it engraves a connecting channel 72. When video signal 82 shifts to a highlight level as indicated by the reference numeral 90, stylus 20 oscillates between a position out of engraving contact with cylinder 10 to an engraving position having a maximum depth HD. AC signal 80, video signal 82 and a white offset signal are produced by setup circuit 34.

In general the depth of stylus 20 at any instant in time is given by the equation:

$$D(t)=Ka*A*(\sin(\chi*t)-1)-WD+Kd*V(t)$$

where:
Ka=gain factor of the AC amplifier
A=maximum value of the AC reference signal
$\chi$=frequency of AC reference signal
t=time
WD=white offset
Kd=gain factor of video amplifier
V(t)=video voltage at input (function of time)

The maximum black depth occurs when $\sin(\chi*t)=1$ and v(t)=Vmax. Therefore the black depth is given by:

$$BD=Kd*V\text{max}-WD \qquad (1)$$

The channel depth CD occurs when $\sin(\chi*t)=0$ and v(t)=Vmax. Therefore the channel depth is given by:

$$CD=Ka*A-WD+Kd*V\text{max} \qquad (2)$$

The highlight depth HD occurs when $\sin(\chi*t)=1$ and v(t)=highlight voltage Vh. Therefore:

$$HD=Kd*Vh-WD \qquad (3)$$

When an engraving system is being set up, the values of BD, CD, and HD (or the functionally interchangeable cell width dimensions BW, CW and HW) are specified. Vh is also specified, and Vmax and A are known. Thus the problem becomes one of finding the values of the engraving parameters Kd, Ka and WD which will produce the specified values of BD, CD, and HD at the specified Vh. Setup circuit 34 accepts values for the six known setup parameters and performs a simultaneous solution of equations (1)–(3) to determine the three unknown engraving parameters.

The solution of the above equations may be carried out in many different ways, using either analog or digital devices. For example, a simply implemented digital procedure may use the following equivalent set of equations:

$$Kd=(BD-HD)/(V\text{max}-Vh) \qquad (4)$$

$$WD=Kd*V\text{max}-ED \qquad (5)$$

$$Ka=(CD+WD-Kd*V\text{max})/A \qquad (6)$$

Equations (4)–(6) may be solved in sequence. Thus the value of Kd obtained from the solution of Equation (4) may be used in the solutions of Equations (5) and (6), and the value of WD obtained from Equation (5) may be used in Equation (6).

If it is desired to use operator inputs BW, CW and HW from potentiometer devices, as illustrated in FIG. 1, then an analog to digital conversion is performed, and the resulting digital quantities are multiplied by a stylus constant Ks for conversion to equivalent values of BD, CD and HD. For a typical stylus-having a tip shape as illustrated in FIG. 1, Ks is given by the equation:

$$Ks=1/(2*\tan(\text{tip}/2))$$

where tip is the angle of the stylus tip. BD may also be derived from the screen angle, if desired.

In the event that there is a small error in the positioning of the shoe against printing cylinder 10, then the setup parameter S may be supplied to setup circuit 34. If this signal is generated, it is treated as an offset and is simply added to BD, CD and HD prior to performing the above outlined solution.

Figure 4:
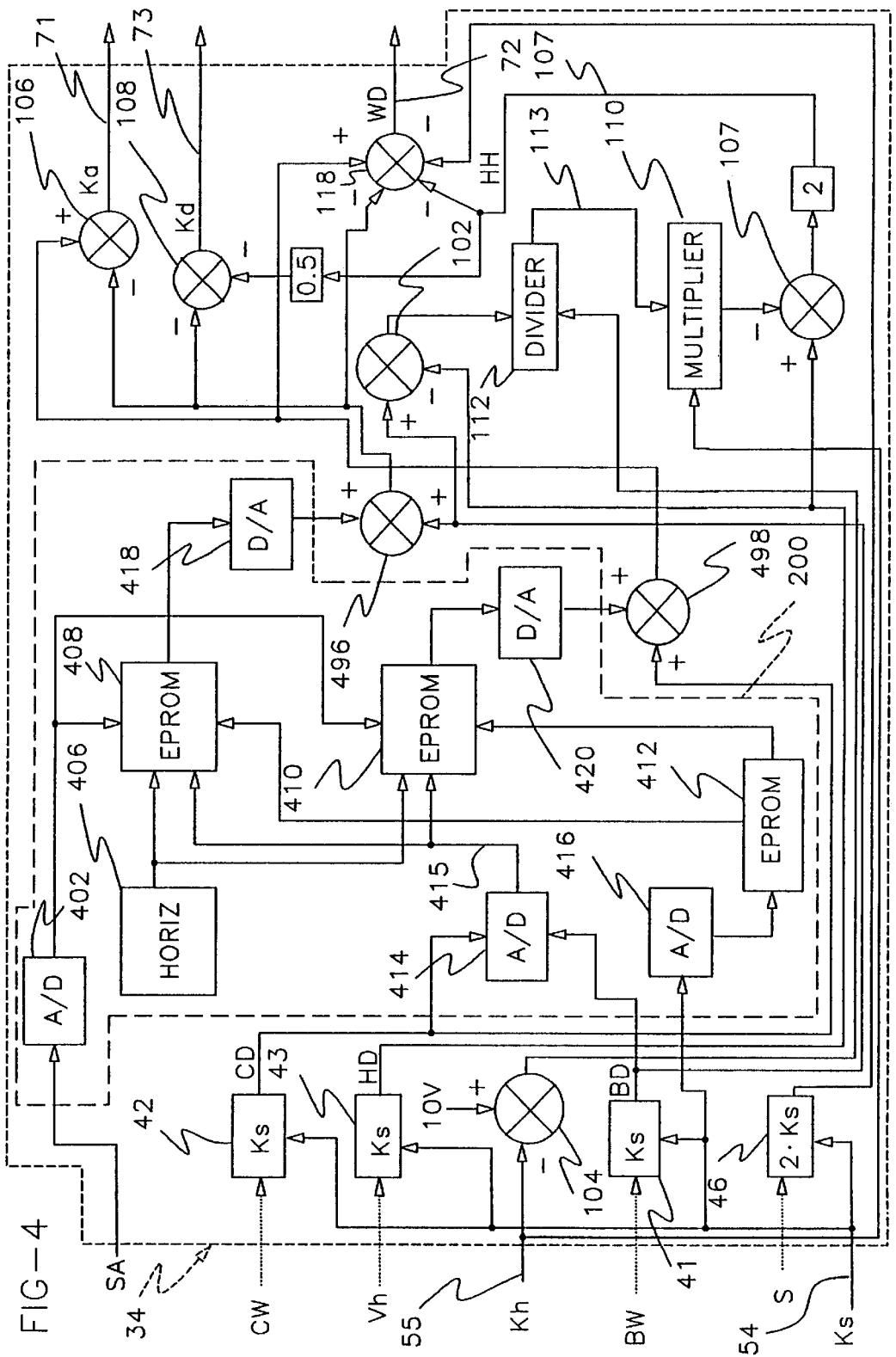
FIG. 4 is a block diagram of a stylus setup circuit.

An equivalent analog solution is illustrated in block diagram form in FIG. 4. In the illustrated arrangement some of the functions of control panel 32 are incorporated into setup circuit 34. In particular, setup circuit 34 includes the controls 41, 42, 43 and 46 which are potentiometers having dial markings for manual setting of Black Width (BW), Channel Width (CW), Highlight Width (HW) and shoe offset (S) respectively. Signals indicating the stylus constant Ks and a highlight voltage Vh are received on input lines 54 and 55. The BW, CW and HW inputs are multiplied by the stylus constant Ks to generate signals corresponding to the Black Depth, BD, Channel Depth, CD, and Highlight Depth, HD.

For the specific embodiment of the invention illustrated in FIG. 4, the video signal varies over a range from 0 to 10 volts as the graphic content in a scanned original document ranges from white to black. Highlight voltage Kh represents the video voltage which is to be assigned to a highlight cell of the width indicated by HW. The value of Kh is subtracted from 10 volts at a summing junction 104 to produce a dividend signal for a divider circuit 112. Meanwhile summing junction 102 generates a divisor signal which is equal to BD—HD. BD may be optionally adjusted as described below.

Figure 5:
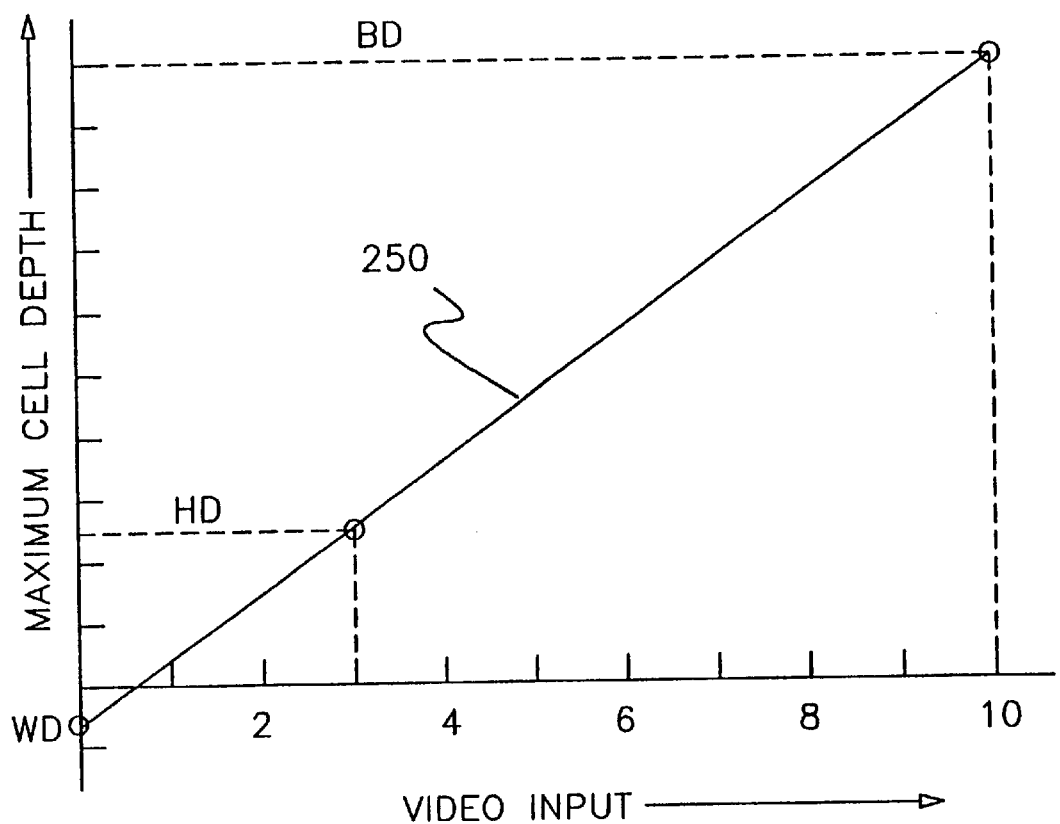
FIG. 5 is a graphical plot of the maximum cell depths resulting from video input signals ranging from 0 to 10 volts.

The divisor signal is used by divider circuit 112 to produce a quotient on line 113 which is the cotangent of the slope angle for an engraving response line 250 as shown in the graph of FIG. 5. Engraving response line 250 illustrates the full range of maximum cell depths to be engraved in response to video signals ranging from 0 to 10 volts.

Setup circuit 34 produces multiplier signals Kd and Ka on lines 73, 71 and an appropriate white offset signal WD on line 72 for causing engraving stylus 20 to engrave in a manner which will produce an engraving response line 250 having the desired slope and position. The production of signals Kd, Ka and WD involves applying the quotient on line 113 to multiplier 110 and multiplying it by Kh. The resulting product is added to HD at summing junction 107 and multiplied by 2 to produce a highlight offset HH on line 107.

HH is multiplied by 0.5 and combined with BD at summing junction 108 to produce Kd. HH is also applied to summing junction 118 to contribute to the production of the white offset WD. Summing junction 118 also receives a shoe bias term from potentiometer 46, an adjusted channel depth from summing junction 498 and the adjusted black depth from summing junction 496. Ka is produced at summing junction 106 by subtracting the adjusted black depth from the adjusted channel depth.

It has been found that copper gravure printing cylinders respond in a linear manner to cutting by a diamond stylus only to a certain depth for a given cell geometry. A linear response is one in which a factor of x increase in head current results in a factor of x increase in stylus depth into the copper through the specified range of stylus movement.

In those cases where the non-linearity is objectionable, an optional linearizer 200 may be inserted into setup circuit 34. Linearizer 200 corrects both the full cell width BW and the channel width CW. For this purpose linearizer 200 uses screen angle SA, horizontal resolution Ks, BW and CW as inputs. These parameters fully define the cell geometry and also are sufficient for a calculation of cylinder surface speed.

It has also been found that engraving non-linearities for a copper cylinder are dependant upon the ratio of CW to BW.

In a typical embodiment, as illustrated in FIG. 4, the screen angle may be input to linearizer 200 as an analog signal. The horizontal resolution may be input manually in digital form at block 406 through use of pushbuttons configured to generate a BCD code indicating the number of lines per inch. Block 406 may include an EPROM for converting such a BCD code to binary form for transmission to another EPROM 408 and an EPROM 410. The screen angle SA may be converted to a digital format by an A/D converter 402. The digitized screen angle is also applied to EPROM 408 and EPROM 410.

The stylus factor Ks is applied to an analog-to-digital converter 416 and digitized for transmission to an EPROM 412. EPROM 412 converts the digitized stylus factor into a stylus angle for transmission to EPROM 408 and EPROM 410. BD and CD are applied to A/D converter 414 which calculates the ratio CD/BD. This ratio (which is equal to CW/BW) is transmitted in digital form to EPROM 408 and EPROM 410.

EPROM 408 calculates a correction for the black cell depth BD in digital form. The correction to BD is converted into analog form by digital-to-analog converter 418 and added to the raw value of BD at summing junction 496. Similarly, EPROM 410 computes a correction to the channel depth CD which is converted to analog format by digital-to-analog converter 420 and added to the raw value of CD at summing junction 498.

The necessary corrections for BD and CD are established empirically and stored in EPROM 408 and 410 in tabulated form. The corrections in each EPROM are tabulated as functions of CW/BW, stylus geometry, screen angle and horizontal resolution. Correction tables may be established by disconnecting D/A converters 418 and 420 from summing junctions 496,498 respectively and engraving a printing cylinder at different screen angles over a range of horizontal resolutions, a range of stylus angles and a range of values for CW/BW. At each setting analog signals are added to summing junctions 496 and 498 and are adjusted until the black width produced by the engraving stylus equals the input black width and the channel width equals the input channel width. The values of these signals represents the engraving error at the indicated cell geometry for the given stylus angles. These values are tabulated and stored in EPROM 408 and 410 for automatically linearizing the response of setup circuit 34 to the normal setup parameters. Consequently, a response as illustrated in FIG. 5 may be obtained.

Referring again to FIG. 5, the maximum cell depth is seen to be directly proportional to the video input signal. As illustrated in the figure, a maximum 10 volt video input signal produces the maximum cell depth BD required for engraving a black cell. For the illustrated example, setup circuit 34 has been given a highlight width HW=0.25 * BW. Hence the highlight depth HD is 25% of BD. The Figure also reflects a setting of 3 volts for Kh. Under those conditions a video signal having an amplitude equal to 30% of a "black" video signal produces a cut having a depth which is only 25% of the black cell depth. As a result the maximum cell depth goes to zero for a video input of about 0.7 volts. For video signals smaller than that amount, the cutting stylus remains out of contact with the printing cylinder. For a "white" video input the stylus is retracted from the engraving cylinder by a minimum distance WD, which is the white offset.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An engraving signal generating system for use on an engraver comprising:

input means for inputting a plurality of engraving parameters; and processing means for suing said plurality of engraving parameters to generate an engrave drive signal in response thereto, wherein said processing means generates a gain for adjusting an amplifier.

2. The engraving signal generating system as recited in claim 1 wherein said amplifier comprises an AC amplifier.

3. The engraving signal generating system as recited in claim 1 wherein said amplifier comprises a video amplifier.

4. The engraving signal generating system as recited in claim 1 wherein said plurality of engraving parameters comprise at least one of the following:

a black width, channel width, highlight width, stylus tip constant, a voltage, black depth, screen resolution, screen angle, stylus angle, shoe position, video focus position, or percent channel width.

5. The engraving signal generating system as recited in claim 4 wherein said input means modifies a video signal in response to a change in at least one of said plurality of engraving parameters.

6. The engraving signal generating system as recited in claim 4 wherein said input means modifies a AC signal in response to a change in at least one of said plurality of engraving parameters.

7. The engraving signal generating system as recited in claim 1 wherein said input means modifies a white depth WD in response to a change in at least one of said plurality of engraving parameters.

8. The engraving signal generating system as recited in claim 1 wherein said input means comprises a setup circuit for receiving said plurality of engraving parameters and for generating a plurality of engraving signals in response thereto.

9. The engraving signal generating system as recited in claim 1 wherein said input means comprises a setup circuit for loading said plurality of engraving parameters in real units.

10. The engraving signal generating system as recited in claim 1 wherein said real units are microns.

11. The engraving signal generating system as recited in claim 1 wherein said plurality of engraving parameters correspond to at least one cell.

12. An engraving system for engraving a plurality of engraved areas on a workpiece comprising:

an engraver responsive to engraving drive signals for engraving said workpiece; and an engraving signal generator coupled to said engraver for receiving engraving parameters and for configuring said engraving drive signals, wherein said plurality of engraving parameters correspond to at least once cell; and wherein said processing means generates a gain for adjusting an amplifier.

13. The engraving system as recited in claim 12 wherein said amplifier comprises an AC amplifier.

14. The engraving system as recited in claim 12 wherein said amplifier comprises a video amplifier.

15. The engraving system as recited in claim 12 wherein said engraving signal generator comprises:

input means for receiving said engraving parameters; and processing means for using said engraving parameters to generate an engrave drive signal in response thereto.

16. The engraving system as recited in claim 12 wherein said plurality of engraving parameters include at least one of the following:

a black width, channel width, highlight width, stylus tip constant, a voltage, black depth, screen resolution, screen angle, stylus angle, shoe position, video focus position, or percent channel width.

17. The engraving system as recited in claim 12 wherein said input means comprises a setup circuit for receiving said engraving parameters and for generating a plurality of engraving signals in response thereto.

18. The engraving system as recited in claim 12 wherein said input means comprises a setup circuit for loading said plurality of engraving parameters in real units.

19. The engraving system as recited in claim 18 wherein said real units are microns.

20. The engraving system as recited in claim 12 wherein said plurality of engraving parameters correspond to at least one cell.

21. The engraving system as recited in claim 15 wherein said input means modifies a video signal in response to a change in at least one of said plurality of engraving parameters.

22. The engraving system as recited in claim 15 wherein said input means modifies a AC signal in response to a change in at least one of said plurality of engraving parameters.

23. The engraving system as recited in claim 15 wherein said input means modifies a white depth WD in response to a change in at least one of said plurality of engraving parameters.

24. The engraving system as recited in claim 16 wherein said engraver is an electro-mechanical engraver.

* * * * *